(12) United States Patent
Mc Lain et al.

(10) Patent No.: US 7,441,450 B2
(45) Date of Patent: Oct. 28, 2008

(54) INTAKE AIR OVER-RESTRICTION MONITORING

(75) Inventors: Kurt D. Mc Lain, Clarkston, MI (US); Wenbo Wang, Novi, MI (US); Michael A. Kropinski, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 92 days.

(21) Appl. No.: 11/669,414

(22) Filed: Jan. 31, 2007

(65) Prior Publication Data
US 2008/0178842 A1 Jul. 31, 2008

(51) Int. Cl.
*G01M 15/00* (2006.01)

(52) U.S. Cl. .................................................. 73/114.37

(58) Field of Classification Search .............. 73/114.31, 73/114.32, 114.33, 114.36, 114.37; 116/DIG. 25; 340/438, 439
See application file for complete search history.

(56) References Cited

U.S. PATENT DOCUMENTS

| | | | | |
|---|---|---|---|---|
| 5,606,311 A | * | 2/1997 | Polidan et al. | 340/607 |
| 6,636,796 B2 | * | 10/2003 | Kolmanovsky et al. | 701/104 |
| 6,763,708 B2 | * | 7/2004 | Ting et al. | 73/114.74 |
| 7,292,931 B2 | * | 11/2007 | Davis et al. | 701/110 |
| 7,305,298 B2 | * | 12/2007 | McLain et al. | 701/106 |
| 2003/0029233 A1 | * | 2/2003 | Ting et al. | 73/118.1 |
| 2003/0154777 A1 | * | 8/2003 | Worth et al. | 73/118.2 |
| 2004/0178895 A1 | * | 9/2004 | Pontius | 340/439 |

* cited by examiner

*Primary Examiner*—Eric S McCall

(57) ABSTRACT

A method of monitoring air flow restriction in an air intake of an internal combustion engine includes monitoring a plurality of manifold absolute pressure (MAP) samples and determining respective MAP thresholds corresponding to each of the MAP samples. Each of the MAP samples is compared to its respective MAP threshold. A percentage of failed MAP samples is determined based on the comparing and an over-restricted air intake condition is selectively indicated based on the percentage of failed MAP samples.

21 Claims, 4 Drawing Sheets

INTAKE AIR OVER-RESTRICTION MONITORING

FIELD

The present disclosure relates to internal combustion engines, and more particularly to monitoring restricted air flow through an air intake of an internal combustion engine.

BACKGROUND

The statements in this section merely provide background information related to the present disclosure and may not constitute prior art.

Internal combustion engines combust a fuel and air mixture to produce drive torque. More specifically, air is drawn into the engine through a throttle. The air is mixed with fuel and the air and fuel mixture is compressed within a cylinder using a piston. The air and fuel mixture is combusted within the cylinder to reciprocally drive the piston within the cylinder, which in turn rotationally drives a crankshaft of the engine.

Engine operation is regulated based on several parameters including, but not limited to, intake air temperature (IAT), manifold absolute pressure (MAP), throttle position (TPS) and engine RPM. With specific reference to the throttle, the state parameters (e.g., air temperature and pressure) before the throttle are good references that can be used for engine control and diagnostic. For example, proper functioning of the throttle can be monitored by calculating the flow through the throttle for a given throttle position and then comparing the calculated air flow to a measured or actual air flow. As a result, the total or stagnation air pressure before the throttle (i.e., the pre-throttle air pressure) is critical to accurately calculate the flow through the throttle. Alternatively, the total pressure and/or static pressure can be used to monitor air filter over-restriction.

An air filter is often used in an internal combustion engine to remove contamination from the induction air. Over a period of use the air filter can become plugged and over-restrict the air flow into the engine. Other factors can affect the air flow through the throttle such as, for example, the air intake becoming plugged by dirt or a foreign substance or object, which can also result in an over-restricted air flow condition. The over-restricted air flow condition can reduce performance, reduce fuel economy and increase engine emissions. Therefore, it is important to determine whether air flow is over-restricted.

SUMMARY

Accordingly, the present invention provides a method of monitoring air flow restriction in an air intake of an internal combustion engine. The method includes monitoring a plurality of manifold absolute pressure (MAP) samples and determining respective MAP thresholds corresponding to each of the MAP samples. Each of the MAP samples is compared to its respective MAP threshold. A percentage of failed MAP samples is determined based on the comparing and an over-restricted air intake condition is selectively indicated based on the percentage of failed MAP samples.

In other features, the step of determining respective MAP thresholds includes monitoring a throttle position and an engine RPM associated with each of the MAP samples, and determining a respective MAP threshold for a particular MAP samples based on the throttle position and the engine RPM associated therewith. The respective MAP threshold is determined from a look-up table.

In other features, the method further includes modifying each of the MAP thresholds. The step of modifying includes monitoring an intake air temperature and a mass air flow (MAF) associated with each of the MAP samples, and determining a respective modification factor for a particular MAP threshold based on the intake air temperature and the MAF. The particular MAP threshold is modified by multiplying the particular MAP threshold by its corresponding modification factor. The method further includes determining the respective modification factor from a look-up table.

In still another feature, the method further includes determining a throttle position, and executing the method when the throttle position is greater than a threshold throttle position.

In yet another feature, the over-restricted air intake condition is indicated when the percentage failed is greater than a threshold percentage.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
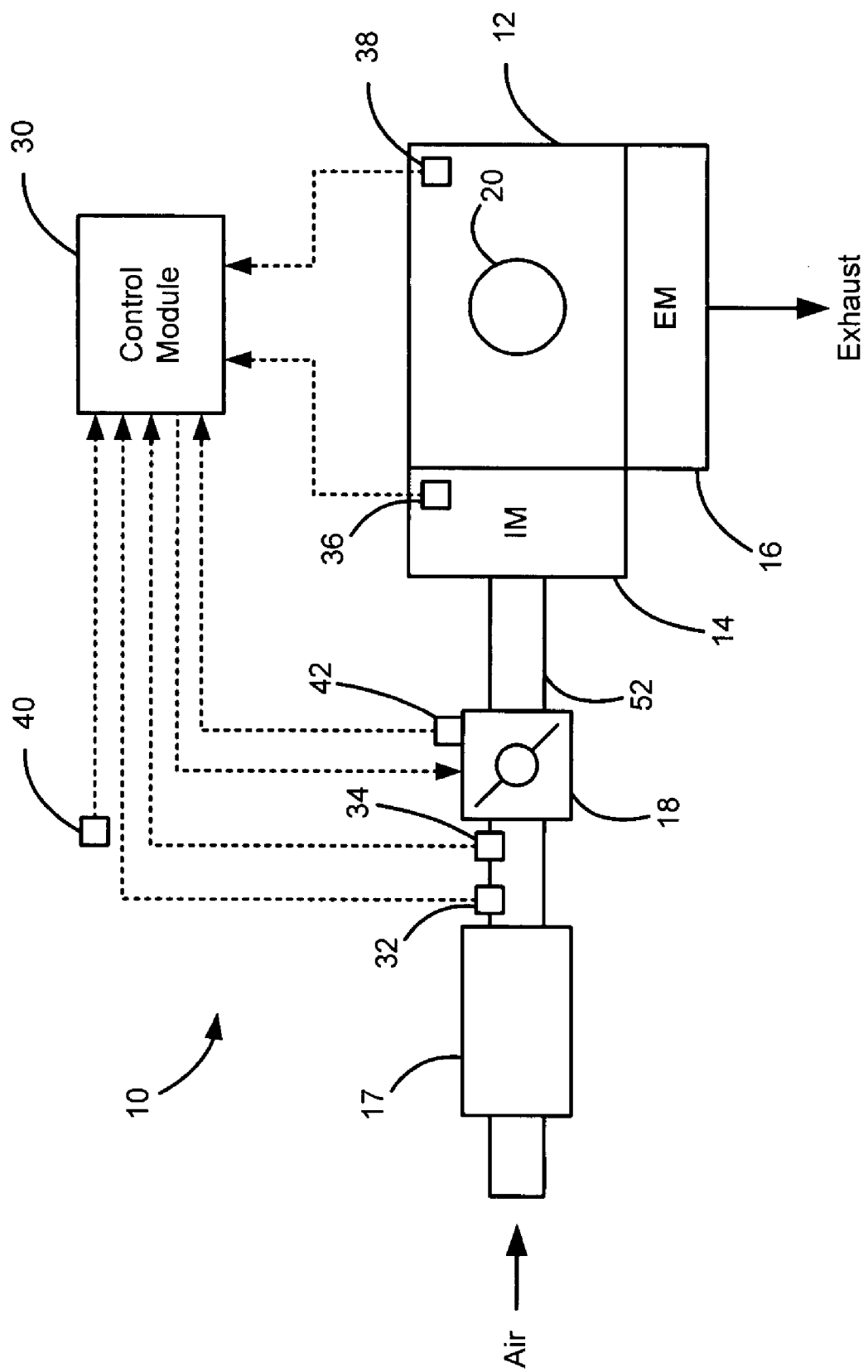
FIG. 1 is a functional block diagram of an internal combustion engine system that is regulated in accordance with the air intake over-restriction control of the present disclosure.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary internal combustion engine system 10 is illustrated. The engine system 10 includes an engine 12, an intake manifold 14 and an exhaust manifold 16. Air is drawn into the intake manifold 14 through an air filter 17 and a throttle 18. The air is mixed with fuel, and the fuel and air mixture is combusted within a cylinder 20 of the engine 12. More specifically, the fuel and air mixture is compressed within the cylinder 20 by a piston (not shown) and combustion is initiated. The combustion process releases energy that is used to reciprocally drive the piston within the cylinder 20. Exhaust that is generated by the combustion process is exhausted through the exhaust manifold 16 and is treated in an exhaust after-treatment system (not shown) before being released to atmosphere. Although a single cylinder 20 is illustrated, it is anticipated that the pre-throttle estimation control of the present invention can be implemented with engines having more than one cylinder.

A control module 30 regulates engine operation based on a plurality of engine operating parameters including, but not limited to, a throttle position (TPS), a mass air flow (MAF), a manifold absolute pressure (MAP), an effective throttle area ($A_{EFF}$), an intake air temperature (IAT) and an engine RPM. IAT, MAF, MAP and engine RPM are determined based on signals generated by an IAT sensor 32, a MAF sensor 34, a MAP sensor 36 and an engine RPM sensor 38, respectively, which are all standard sensors of an engine system. $A_{EFF}$ is determined based on TPS, which is determined by a throttle position sensor 42, which is also a standard sensor. A barometric pressure ($P_{BARO}$) is monitored using a barometric pressure sensor 40.

Figure 2:
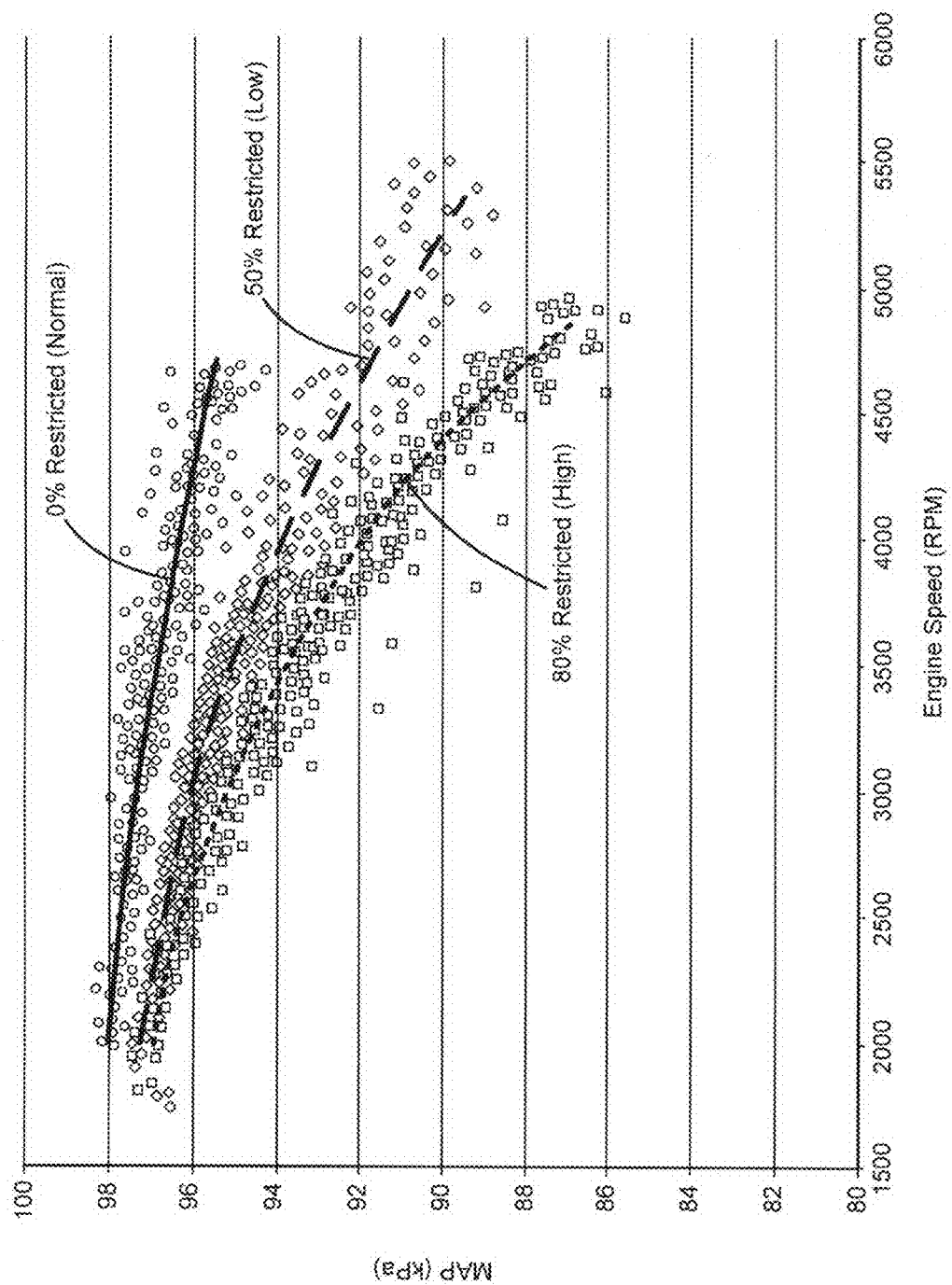
FIG. 2 is a graph of exemplary manifold absolute pressure (MAP) versus engine RPM traces for a plurality of restricted air intakes for a fixed throttle position.

The air intake over-restriction control of the present disclosure determines whether the air intake is so restricted that it is considered over-restricted and the air flow into the engine is unacceptably low. More specifically, MAP values will be lower as the air flow restriction of the induction system increases and RPM values increase. This is graphically illustrated in FIG. 2 for an exemplary fixed TPS of greater than 80%. The data points and curve fit associated with the label 0% indicate those of a normal air intake (i.e., normally restricted air flow). The data points and curve fit associated with the labels 50% and 80% indicate those that are associated with increasingly restricted air intake. More specifically, the 50% data points and curve fit corresponds to a 50% restricted air flow and the 80% data points and curve fit to an 80% restricted air flow. A 100% restricted air flow (not shown here) means the intake system is over-restricted. As can be seen, the MAP values decrease with increasing RPM and decrease more rapidly based on the level of intake restriction.

The air intake over-restriction control considers MAP values that are monitored above a threshold TPS ($TPS_{THR}$) (e.g., 80% TPS) because there is greater separation between a normally restricted and an over-restricted induction system at TPSs above $TPS_{THR}$. Accordingly, the control of the present disclosure provides improved accuracy and reduction of hardware costs over traditional systems that implement a mechanical gauge located within the induction system, to measure the intake system pressure loss. More specifically, the detection of an obstruction in the induction system can be achieved with the present disclosure by using software and existing engine sensors.

The air intake over-restriction control monitors MAP and compares MAP to a threshold MAP ($MAP_{THR}$). $MAP_{THR}$ is determined based on TPS and RPM. More specifically, a first fuzzy-logic based look-up table is used to determine $MAP_{THR}$ using TPS and RPM as the table inputs. $MAP_{THR}$ is then modified based on IAT and MAF. More specifically, a second fuzzy-logic based look-up table is used to determine a modification coefficient ($k_{MOD}$), with IAT and MAF as the table inputs. $MAP_{THR}$ is multiplied by $k_{MOD}$ to provide the modified $MAP_{THR}$. Use of the fuzzy-logic based tables and modification of $MAP_{THR}$ increases precision in the algorithm by providing a large matrix of failure thresholds based on TPS, RPM, IAT and MAF. These two-dimensional fuzzy logic tables are very fast in making rapid precise decisions based on interpolation of data points within the two-dimensional tables from input variables (i.e., TPS, RPM, IAT, MAF).

The air intake over-restriction control compares several MAP samples to corresponding $MAP_{THR}$'s and determines what percentage of the MAP samples failed (% failed). A failure is defined as a particular MAP sample being less than its corresponding $MAP_{THR}$. If % failed is greater than a threshold percentage ($\%_{THR}$), the air intake over-restriction control indicates that an over-restricted air intake condition exists.

Figure 3:
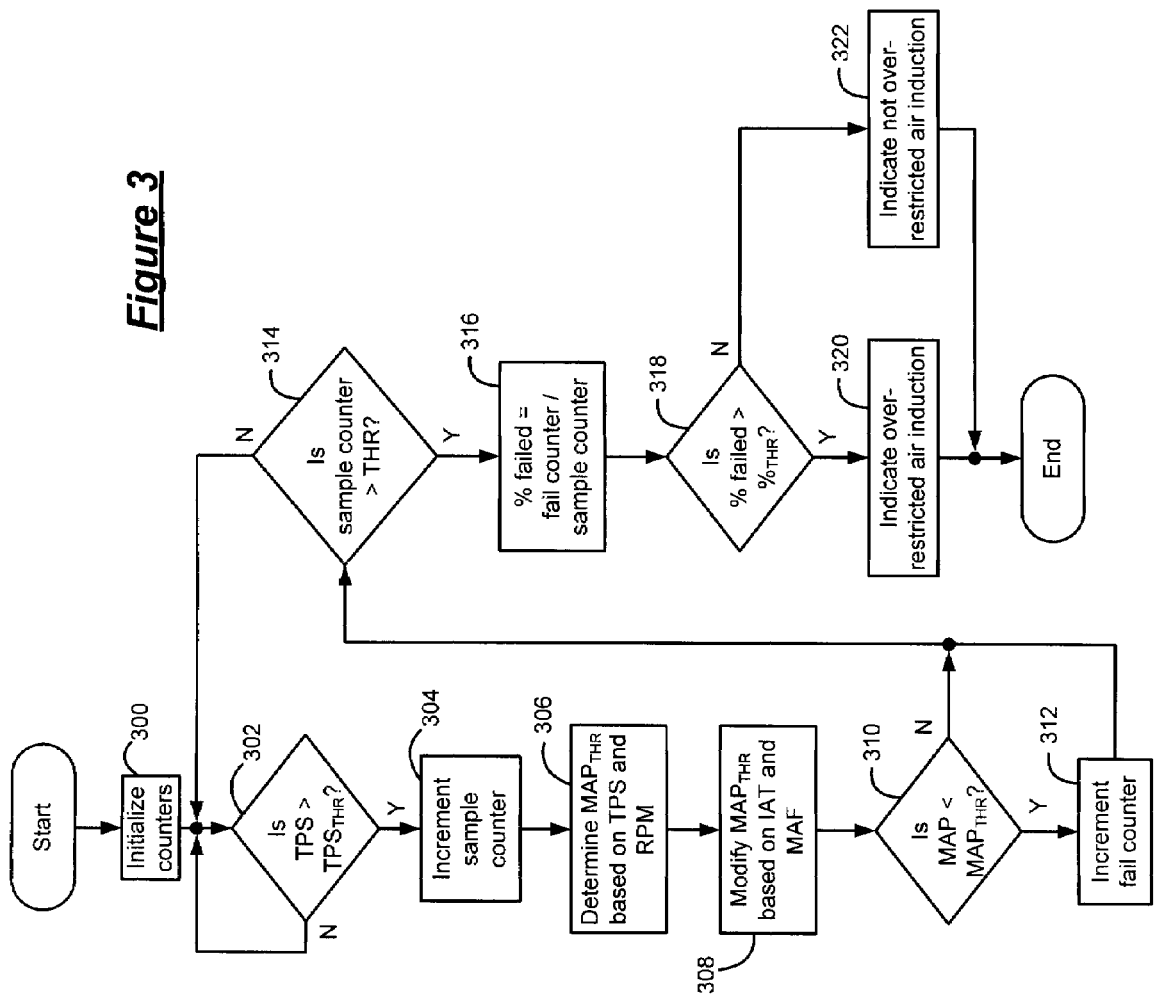
FIG. 3 is a flowchart illustrating exemplary steps that are executed by the air intake over-restriction control of the present disclosure.

Referring now to FIG. 3, exemplary steps that are executed by the air intake restriction control will be described in detail. In step 300, sample and fail counters are initialized. In step 302, control determines whether TPS is greater than a threshold TPS ($TPS_{THR}$). If TPS is greater than $TPS_{THR}$, control continues in step 304. If TPS is not greater than $TPS_{THR}$, control loops back. In step 304, control increments the sample counter.

Control determines $MAP_{THR}$ based on TPS and RPM in step 306. In step 308, control modifies $MAP_{THR}$ based on IAT and MAF, as discussed in detail above. Control determines whether MAP is less than $MAP_{THR}$ in step 310. If MAP is less than $MAP_{THR}$, control continues in step 312. If MAP is not less than $MAP_{THR}$, control continues in step 314. In step 312, control increments the fail counter.

In step 314, control determines whether the sample counter is greater than THR. If the sample counter is not greater than THR, control loops back to step 302. If the sample counter is greater than THR, control continues in step 316. In step 316, control determines % failed based on the fail counter and the sample counter values. Control determines whether % failed is greater than $\%_{THR}$ in step 318. If % failed is not greater than $\%_{THR}$, control indicates that the air flow is not over-restricted in step 322 and control ends. If % failed is greater than $\%_{THR}$, control indicates that the air flow is over-restricted in step 320 and control ends.

Figure 4:
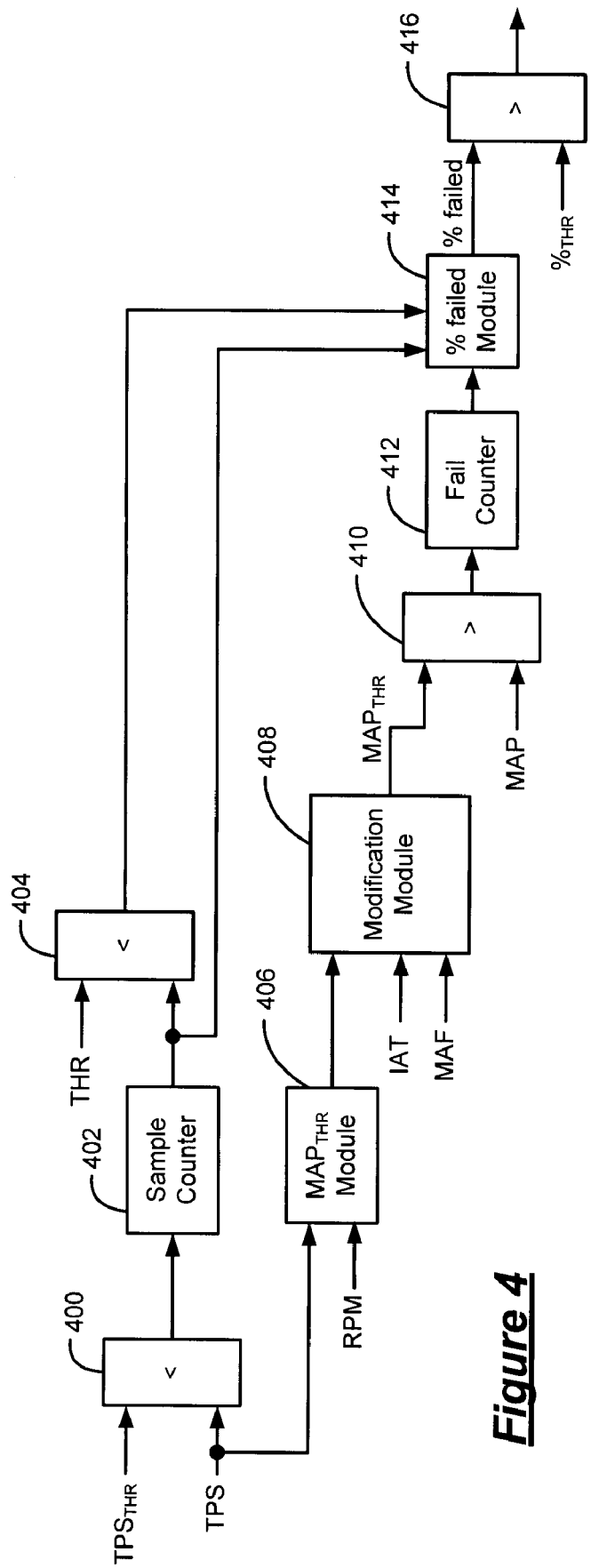
FIG. 4 is a functional block diagram illustrating exemplary modules that execute the air intake over-restriction control.

Referring now to FIG. 4, exemplary modules that execute the air intake restriction control will be described in detail. It is anticipated that the exemplary modules described herein can be combined, as sub-modules, into a single module or multiple modules.

The exemplary modules include a comparator module 400, a sample counter module 402, a comparator module 404, a $MAP_{THR}$ module 406, a modification module 408, a comparator module 410, a fail counter module 412, a % failed module 414 and a comparator 416. The comparator module 400 determines whether TPS is greater than $TPS_{THR}$ and generates a corresponding signal based thereon. The sample counter module 402 increases the sample counter based on the signal from the comparator module 400. The comparator module 404 determines whether the sample counter is greater than THR and generates a signal based thereon.

The $MAP_{THR}$ module 406 determines $MAP_{THR}$ based on TPS and RPM. The modification module 408 modifies $MAP_{THR}$ based on IAT and MAF, as described in detail above. The comparator module 410 determines whether MAP is less than the modified $MAP_{THR}$. The fail counter module 412 is selectively incremented based on the signal generated by the comparator module 410. The % failed module 414 determines % failed based on the output of the sample counter module 402, the output of the comparator module 404 and the output of the fail counter module 412. The comparator module 416 determines whether % failed is less than $\%_{THR}$ and generates a signal based thereon. Whether the air flow is over-restricted is determined based on the signal.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of monitoring air flow restriction in an air intake of an internal combustion engine, comprising:
monitoring a plurality of manifold absolute pressure (MAP) samples;
determining respective MAP thresholds corresponding to each of said MAP samples;
comparing each of said MAP samples to its respective MAP threshold;
determining a percentage of failed MAP samples based on said comparing; and
selectively indicating an over-restricted air intake condition based on said percentage of failed MAP samples.

2. The method of claim 1 wherein said step of determining respective MAP thresholds comprises:
monitoring a throttle position and an engine RPM associated with each of said MAP samples; and
determining a respective MAP threshold for a particular MAP samples based on said throttle position and said engine RPM associated therewith.

3. The method of claim 2 wherein said respective MAP threshold is determined from a look-up table.

4. The method of claim 1 further comprising modifying each of said MAP thresholds.

5. The method of claim 4 wherein said step of modifying comprises:
monitoring an intake air temperature (IAT) and a mass air flow (MAF) associated with each of said MAP samples; and
determining a respective modification factor for a particular MAP threshold based on said IAT and said MAF, wherein said MAP threshold is modified by multiplying said MAP threshold by its corresponding modification factor.

6. The method of claim 5 further comprising determining said respective modification factor from a look-up table.

7. The method of claim 1 further comprising:
determining a throttle position; and
executing the method when said throttle position is greater than a threshold throttle position.

8. The method of claim 1 wherein said over-restricted air intake condition is indicated when said percentage failed is greater than a threshold percentage.

9. A system for monitoring air flow restriction in an air intake of an internal combustion engine, comprising:
a first module that determines respective MAP thresholds corresponding to each of a plurality of monitored MAP samples;
a second module that compares each of said MAP samples to its respective MAP threshold;
a third module that determines a percentage of failed MAP samples based on said comparing; and
a fourth module that selectively indicates an over-restricted air intake condition based on said percentage of failed MAP samples.

10. The system of claim 9 wherein said first module determines said respective MAP thresholds based on a throttle position and an engine RPM associated with each of said MAP samples.

11. The system of claim 10 wherein said respective MAP threshold is determined from a look-up table.

12. The system of claim 9 further comprising a fifth module that modifies each of said MAP thresholds.

13. The system of claim 12 wherein said fifth module monitors an intake air temperature (IAT) and a mass air flow (MAF) associated with each of said MAP samples, and determines a respective modification factor for a particular MAP threshold based on said IAT and said MAF, wherein said MAP threshold is modified by multiplying said MAP threshold by its corresponding modification factor.

14. The system of claim 13 wherein said fifth module implements a look-up table to determine said respective modification factor.

15. The system of claim 9 wherein a throttle position is determined and the described functions of each of said modules are executed when said throttle position is greater than a threshold throttle position.

16. The system of claim 9 wherein said over-restricted air intake condition is indicated when said percentage failed is greater than a threshold percentage.

17. A method of monitoring air flow restriction in an air intake of an internal combustion engine, comprising:
determining a throttle position;
monitoring a plurality of manifold absolute pressure (MAP) samples;
determining respective MAP thresholds corresponding to each of said MAP samples when said throttle position exceeds a threshold throttle position;
monitoring an intake air temperature (IAT) and a mass air flow (MAF) associated with each of said MAP samples;
determining a respective modification factor for a particular MAP threshold based on said IAT and said MAF, wherein said MAP threshold is modified by multiplying said MAP threshold by its corresponding modification factor;
comparing each of said MAP samples to its respective MAP threshold;
determining a percentage of failed MAP samples based on said comparing; and
selectively indicating an over-restricted air intake condition based on said percentage of failed MAP samples.

18. The method of claim 17 wherein said step of determining respective MAP thresholds comprises:
monitoring said throttle position and an engine RPM associated with each of said MAP samples; and
determining a respective MAP threshold for a particular MAP samples based on said throttle position and said engine RPM associated therewith.

19. The method of claim 18 wherein said respective MAP threshold is determined from a look-up table.

20. The method of claim 17 further comprising determining said respective modification factor from a look-up table.

21. The method of claim 17 wherein said over-restricted air intake condition is indicated when said percentage failed is greater than a threshold percentage.

* * * * *